United States Patent
Smith, Jr. et al.

(10) Patent No.: US 6,490,343 B2
(45) Date of Patent: Dec. 3, 2002

(54) SYSTEM AND METHOD OF NON-SPOKEN TELEPHONE COMMUNICATION

(75) Inventors: Newton James Smith, Jr., Austin, TX (US); Herman Rodriguez, Austin, TX (US); Randolph Michael Forlenza, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/399,238

(22) Filed: Sep. 16, 1999

(65) Prior Publication Data

US 2002/0001368 A1 Jan. 3, 2002

(51) Int. Cl.[7] .............................................. H04M 11/00

(52) U.S. Cl. ..................... 379/52; 379/93.17; 379/88.24

(58) Field of Search ................................ 379/52, 93.26, 379/93.17, 931.18, 93.23, 93.27, 88.24

(56) References Cited

U.S. PATENT DOCUMENTS

| | | | |
|---|---|---|---|
| 4,426,555 A | | 1/1984 | Underkoffler |
| 4,608,457 A | * | 8/1986 | Fowler et al. ................. 379/52 |
| 4,650,927 A | | 3/1987 | James |
| 4,794,639 A | * | 12/1988 | Urui et al. ..................... 379/89 |
| 5,121,421 A | | 6/1992 | Alheim |
| 6,057,887 A | * | 5/2000 | Imanaka et al. .......... 379/93.23 |
| 6,049,291 A1 | * | 4/2001 | Kikinis .................... 340/825.44 |

FOREIGN PATENT DOCUMENTS

| | | | | | |
|---|---|---|---|---|---|
| JP | 402217091 A | * | 8/1980 | ............ | H04N/7/13 |
| JP | 363180261 A | * | 7/1988 | .......... | H04M/11/00 |
| JP | 401293745 A | * | 11/1989 | ............ | H04M/3/42 |
| JP | 402186751 A | * | 7/1990 | ............ | H04M/1/64 |
| JP | 409205497 A | * | 8/1997 | .......... | H04M/11/02 |
| JP | 410107919 A | * | 4/1998 | .......... | H04M/11/00 |

OTHER PUBLICATIONS

Shennib et al., "An Improved Telecommunication Aid for the Deaf," IEEE Frontiers of Engineering and Computing in Health Care, Sep. 1984, pp. 38–40.

Kraft, "DTMF Message Decoders, Telephone Aids for the Hearing Impaired," Circuit Celler INK®, Issue 87, Oct. 1997.

* cited by examiner

*Primary Examiner*—Melur Ramakrishnaiah
(74) *Attorney, Agent, or Firm*—Kevin L. Daffer; Conley, Rose & Tayon P.C.; Marilyn S. Dawkins

(57) ABSTRACT

A system and method are presented for sending a message from one telephone to another by transmission of a short code. A set of message units stored within the receiving telephone is assigned to a set of codes which may be transmitted. The receiving telephone is a code-compatible telephone configured to detect an incoming code and forward the corresponding message unit to an output device associated with the code-compatible telephone. A message unit may comprise an entire message, or a portion of a message, such that multiple message units are combined to form a message. The message units may be alphanumeric or non-alphanumeric. An alphanumeric message unit contains multiple alphanumeric characters, while a non-alphanumeric message unit may contain graphical or auditory information. An alphanumeric or graphic message unit is forwarded to a display screen on the code-compatible telephone if the corresponding code is received. An auditory message unit is instead forwarded to the telephone's loudspeaker. The codes may be transmitted using dual-tone-multi-frequency (DTMF) tones, digital signals, or other signals convertible to a form detectable by the code-compatible telephone. Transmission of codes to a code-compatible telephone may be used in one-way or two-way non-spoken communication by telephone, which may be useful for people with hearing and/or speech impairment, or for people in an environment in which spoken telephone communication is difficult or undesirable.

9 Claims, 4 Drawing Sheets

| 60 | 62 | |
|---|---|---|
| 0 | HELLO | |
| 1 | YES | |
| : | : | |
| 9 | THANK YOU | |
| 10 | IS JOHN HOME? | |
| 11 | PLEASE TAKE MARY TO SCHOOL TOMORROW | |
| : | : | |
| 99 | THIS IS TO CONFIRM YOUR APPOINTMENT | |

64 encompasses rows 0–9 (66), 68 encompasses rows 10–99 (70).

FIG. 3a

| 60 | 72 | 74 |
|---|---|---|
| : | : | : |
| 21 | AN | I'LL CALL AGAIN TOMORROW |
| 22 | AN | HOW ARE YOU FEELING? |
| 23 | GR | (digitized image data) |
| 24 | AU | (digitized audio amplitude data) |
| : | : | : |
| * | FN | (display upcoming message unit on screen with previous one) |
| ** | FN | (start/finish numerical mode) |

FIG. 3b

SYSTEM AND METHOD OF NON-SPOKEN TELEPHONE COMMUNICATION

BACKGROUND OF THE INVENTION

1. Field of the Invention

This invention relates to communication systems, methods and programs, and more particularly to use of a vocabulary formed using telephone keypad symbols to allow non-spoken communication by telephone.

2. Description of the Related Art

The following descriptions and examples are not admitted to be prior art by virtue of their inclusion within this section.

Communication by telephone has permeated business and social interaction to the point that a telephone is widely considered a necessity. Spoken communication by telephone is generally found to be natural and convenient by users. In some situations, however, spoken communication may be inconvenient or even impossible. For example, hearing-impaired people are generally unable to participate in conventional spoken telephone conversations. Those who have difficulty speaking or are unable to speak (as a result, for example, of congenital problems, illness or injury) have similar problems with telephone usage. Telephone users without hearing or speech impairments may also encounter difficulty with spoken communication in certain circumstances. For example, when a telephone user is located in a very loud environment (such as, e.g., a train station), both participants in the conversation may have difficulty hearing the conversation over the surrounding noise. In other environments, such as during artistic performances, the sound of a person talking on a telephone creates an undesirable distraction for others.

Efforts to enable telephone usage for hearing or speech-impaired persons have long been underway. An older approach which is still relatively common is the use of a teletypewriter, or TTY device. Such a TTY device, also known as a "telecommunication device for the deaf", or TDD, is connected to the telephone of the hearing-impaired person, who communicates by typing onto a keyboard associated with the TDD and reading messages from an associated display. A TDD device must also be used by the person communicating with the hearing-impaired person. If a telephone with a TDD device is not available, a call can be completed by using a TDD relay service. For example, a conventional telephone user may call a TDD relay service, whereupon an operator uses a TDD to contact the TDD of the hearing-impaired person. Use of a human operator in such a relay service is known as "voice carry-over" (VCO). Similarly, a hearing-impaired person may use a TDD to call a telephone number advertised by, for example, a business or government agency to reach a TDD relay service which then contacts the business by conventional telephone.

Use of VCO requires including a third person (the relay operator) in every telephone conversation, thereby compromising the privacy of the conversation. A system which allows TDD communication with an automated interactive menu system (such as may be used by, e.g., financial institutions or airlines in order to supply customer information without employing a human representative) has been disclosed in U.S. Pat. No. 5,121,421 to Alheim. This system includes a means for sending the menu prompts used by the interactive menu system to the TDD device of the hearing-impaired person for display, and receiving signals transmitted by the hearing-impaired person in response to the menu prompts, so that a human relay operator is not needed.

TDD devices transmit characters across a telephone line using coded tone signals. One such code is called Baudot, and ASCII coding may also be used. Other approaches to telephone communication for hearing-impaired users involve transmission of the dual-tone-multi-frequency (DTMF) tones used by a "touch-tone" telephone. The set of DTMF signals typically used in telephone communications includes 12 tones, each tone a sum of tones of two frequencies. One of these two frequencies is from a group of four low-frequency tones, having frequencies form 697 Hz to 941 Hz. Each low-frequency tone is associated with one of the four rows of keys within a touch-tone telephone keypad. The other component of each DTMF tone has a frequency from a group of three high-frequency tones, ranging in frequency from 1209 Hz to 1477 Hz. Each high-frequency tone is associated with one of the three columns in the keypad. Pressing a key results in a specific combination of the corresponding row and column frequencies to produce the tone specific to that key.

In an article by Kraft in *Circuit Cellar* INK®, October 1997, p. 18, a DTMF message decoder and display for use with the telephone of a hearing-impaired person is described. The decoder detects incoming sequences of DTMF tones sent by a standard touch-tone telephone in communication with the telephone of the hearing-impaired person, and displays an alphanumeric character corresponding to each tone sequence on the display so that a message may be read by the hearing-impaired person. Messages are sent to the decoder one letter at a time using a scheme in which multiple key presses are used to distinguish between the different letters associated with each key on the telephone keypad. For example, two presses of the "2" key in rapid succession are interpreted as the letter "B". Another system for converting DTMF tones to alphanumeric characters in a message display for a hearing-impaired telephone user is disclosed in U.S. Pat. No. 4,426,555 to Underkoffler. In this system, the numerals one through nine are each sent by pressing the corresponding key on the telephone keypad once, while other characters such as letters and punctuation marks are sent using two-key sequences.

The above-described systems which display messages formed from characters sent using DTMF codes each require multiple key presses to be used to form most characters, a requirement which may make communication excessively time-consuming, tedious, and prone to error. A different approach to a DTMF decoding system, described in a paper by Shennib and Kondraske in *Frontiers of Engineering and Computing in Health Care—1984: Proceedings—Sixth Annual Conference, IEEE Engineering in Medicine and Biology Society*, allows transmission of words using a single keystroke for each letter of a word. A word is entered into the sending telephone by pressing in sequence the keys corresponding to the letters of the word, so that a numeric code is entered. The most likely word corresponding to the particular numeric code entered is then determined using an algorithm which compares portions of the numeric code to stored data including commonly-used syllables and corresponding numeric codes.

Although the system of Shennib and Kondraske allows a character in a message to be transmitted with a single keystroke rather than multiple keystrokes, all of the above-described approaches require sending messages one character at a time, making communication relatively slow. It would therefore be desirable to develop a system and method to allow more rapid non-spoken communication by telephone.

SUMMARY OF THE INVENTION

The problems outlined above are in large part addressed by a system and method for assigning a short code to each of a set of message units stored in memory within a code-compatible telephone. The message units may be alphanumeric or non-alphanumeric. An alphanumeric information unit preferably includes multiple alphanumeric characters, and may include a word, phrase, or message. For example, a code may be assigned to a particular written message, which may contain one or more sentences. Circuitry and/or software in the telephone is adapted to detect such an incoming code and display the corresponding message on the telephone's display screen. Codes corresponding to phrases or words may also be sent sequentially to create messages, so that a message unit may comprise part of a message. A non-alphanumeric message unit may be a unit of graphic information, such as an icon or image. This graphic information is also forwarded to the telephone's display screen if the corresponding code is received by the telephone. Alternatively, a non-alphanumeric message unit may contain auditory information, or information to be experienced through hearing. If a code corresponding to an auditory message unit is received, the message unit is forwarded to the telephone's loudspeaker. The alphanumeric and non-alphanumeric message units may be generally referred to herein as "message units" or "message information".

After a connection is established between two telephones, the codes corresponding to the message units may be generated by pressing one or more keys on the transmitting telephone's keypad. For example, the code "78" is generated at the transmitting telephone by pressing the "7" and "8" keys sequentially within a programmable time interval (if a longer time interval passes between pressing the two keys, they may be interpreted as separate "7" and "8" codes). If this code corresponds to an alphanumeric message, a corresponding word, phrase, or message (such as, e.g., "Yes" or "Could you repeat that please?") is shown on the receiving telephone's display screen when the code is detected. In a currently preferred embodiment, the transmitting telephone sends DTMF tones when its keypad keys are pressed. The telephone may also send digital signals which are convertible to DTMF tones, however, or other signals capable of being converted to a form detectable by the receiving telephone.

In some embodiments, the transmitting telephone may be configured to store entered codes in a buffer and write them to a display screen on the transmitting telephone, independent of, or without, transmitting a code or codes until instructed to do so by the operator of the transmitting telephone. In such an embodiment, the user of the transmitting telephone may view and/or correct messages before transmission to the receiving telephone. In further embodiments, codes may be entered into the transmitting telephone by selecting a code from a list of codes and corresponding message units which is stored in the telephone.

In one embodiment, the system described herein may be used for non-spoken communication in one direction only. Such an embodiment could be used for communication between a hearing person and a hearing-impaired person who is not speech-impaired. The hearing person enters codes using a telephone keypad, and the corresponding message appears on the display screen of the hearing-impaired person's telephone. The hearing-impaired person speaks to the hearing person in reply, at which time the hearing person may send an additional code, and the conversation continues in this manner. This one-way non-spoken communication mode may also be useful for situations in which only one of the persons involved in a telephone conversation is in an environment in which speaking into a telephone would distract others. The telephone from which the codes are transmitted in this mode may be a conventional telephone; i.e., this telephone does not need to have a display or be specially configured in order to participate in the communication.

In another mode of using the system, both telephones involved in a conversation are used for non-spoken communication. In this mode, each person inputs codes into a telephone, and views information on a display corresponding to codes sent by the other person. This mode may be useful for communication with a person who is both hearing-impaired and speech-impaired, or for communication between two hearing-impaired people. Two-way non-spoken communication could further be advantageous when at least one of the telephones involved is in a very noisy environment, making spoken speech difficult to distinguish, or when each telephone is in an environment in which speaking would distract others. In the two-way non-spoken communication mode, both telephones preferably include a display and are configured to detect codes sent from the other telephone and transfer the corresponding alphanumeric or graphical information to the display. In some embodiments of either the one-way or two-way non-spoken communication modes, a telephone used to transmit codes may be part of an automated interactive menu system.

As noted above, the system and method described herein allow either one-way or two-way non-spoken communication, which is believed to be advantageous for hearing-and/or speech-impaired telephone users, and for other persons in circumstances for which spoken communication is difficult or undesirable. As compared to the systems described in the "Description of the Related Art", the system described herein is believed to provide much faster communication, in that an entire message may be represented by a one- or two-digit code. For example, a two-digit code, entered using two keystrokes on a telephone keypad, could correspond to "I'll call you again tomorrow". When using the systems described in the previous section, on the other hand, this message would take at least 28 keystrokes (the number of characters, including spaces). The system described herein therefore results in much faster message entry. Furthermore, the communications system bandwidth used by a two-digit code representing a message is much smaller than that used by a sequence of codes in which at least one code is needed for each character of the message. Many more conversations can therefore be accommodated by a given communications link.

In an embodiment of the system, some of the codes sent by a transmitting telephone could correspond to auditory signals rather than information intended for visual display. Detection by the receiving telephone of a code corresponding to an auditory signal would result in the auditory signal being sent to the telephone's speaker, rather than to the telephone's display. Transmitting codes corresponding to auditory signals could be advantageous, for example, for a situation in which the transmitting telephone is in an environment for which non-spoken communication is preferred, and the receiving phone is being used by a person unable to read (e.g., a young child). In some embodiments for which auditory message units are used, an image or message is simultaneously forwarded to a display screen associated with the receiving telephone. Such a display would alert a person looking at the display that an auditory message was being sent. This may be useful, for example, in lessening confusion in situations in which an auditory message is inadvertently sent to the code-compatible telephone of a hearing-impaired person. The image or message could also be forwarded to the display screen just before the auditory message is forwarded to the speaker. In this way, a hearing person using a code-compatible telephone having a display screen in the handset would be alerted to move the telephone to put the speaker near the ear and listen to the auditory message. Since telephones having the display screen in the handset do not allow simultaneous viewing of the screen and listening to the speaker, loss of information may be avoided by such an alert.

The receiving of codes corresponding to message information may be implemented using a "code-compatible" telephone including a display, a processor, and memory, in which correspondence data relating codes to message units is stored in the memory, and the processor executes instructions operable to detect incoming codes and forward the corresponding message units to the display (or speaker, in the case of auditory message information). Telephones including a display, processor and memory are currently commercially available and becoming increasingly common, as telephones incorporate increasingly more sophisticated features such as caller identification and directory storage applications. The code-compatible telephone may be configured to communicate over either a cable (also called "land line" or "wireline") or wireless link.

The correspondence data and program instructions described above may be programmed into the telephone at the time of manufacture to form the code-compatible telephone, or downloaded to the telephone using a cable or wireless link. The downloaded data may come from another telephone, or from another device such as a computer. In some embodiments, the correspondence data relating particular codes to message units may be added to or updated by downloading, so that the available message unit options may be customized for particular types of conversation. For example, a different set of message options may be most useful for conversation with a relative than with, for example, a financial institution. In some embodiments, a one-way or two-way transfer of correspondence data may be performed at the beginning of a telephone conversation, to ensure that the most useful messages are available for that conversation. In particular, correspondence data may be transferred from one telephone to a code-compatible telephone independent of, or without (absence of), any action being taken by the operator of the code-compatible telephone. Such a transfer allows very specific messages to be sent to and correctly interpreted by the code-compatible telephone. In another embodiment, a telephone could receive downloaded data from a third party source, as opposed to another telephone to be communicated with. In such an embodiment, a telephone number could be dialed to establish a connection with the third party server (e.g. computer or telephone), and specific data could be downloaded from the server. Such third party servers might offer correspondence data sets for communication regarding specialized topics not generally included in code-compatible telephones as manufactured.

In addition to the code-compatible telephone and methods for its use described above, a method for processing input to a telephone is contemplated herein. A code generated in response to the pressing of one or more keys or selection of a stored code on a transmitting telephone is detected. The message unit corresponding to the detected code is identified, and in the case of verbal or graphical information, is forwarded to the display of the code-compatible telephone. If the message unit is auditory, it is forwarded to the speaker of the telephone. The method may include determining whether input to the telephone constitutes message codes or conventional voice input. The method may also include receiving and/or transmitting correspondence data relating codes to message units.

A computer-usable carrier medium having correspondence data as described above and/or program instructions executable to implement the above-described method for processing input is also contemplated herein. The carrier medium may be a storage medium, such as a magnetic or optical disk, a magnetic tape, or a memory. In addition, the carrier medium may be a wire, cable, or wireless medium along which the program instructions are transmitted, or a signal carrying the program instructions along such a wire, cable or wireless medium. In an embodiment, the carrier medium may contain program instructions executable to implement detection of a code generated in response to pressing one or more telephone keypad keys, identification of the message unit corresponding to the code, and forwarding of the message unit to a display. In some embodiments, the carrier medium further includes instructions executable to forward an auditory message corresponding to a detected code to a speaker. The carrier medium may alternatively contain correspondence data as described above, or may contain both correspondence data and program instructions.

BRIEF DESCRIPTION OF THE DRAWINGS

Other objects and advantages of the invention will become apparent upon reading the following detailed description and upon reference to the accompanying drawings in which:

FIG. 3 illustrates exemplary correspondence data between codes detectable by a code-compatible telephone and message units which may be sent to an output device of the telephone.

Figure 1A:
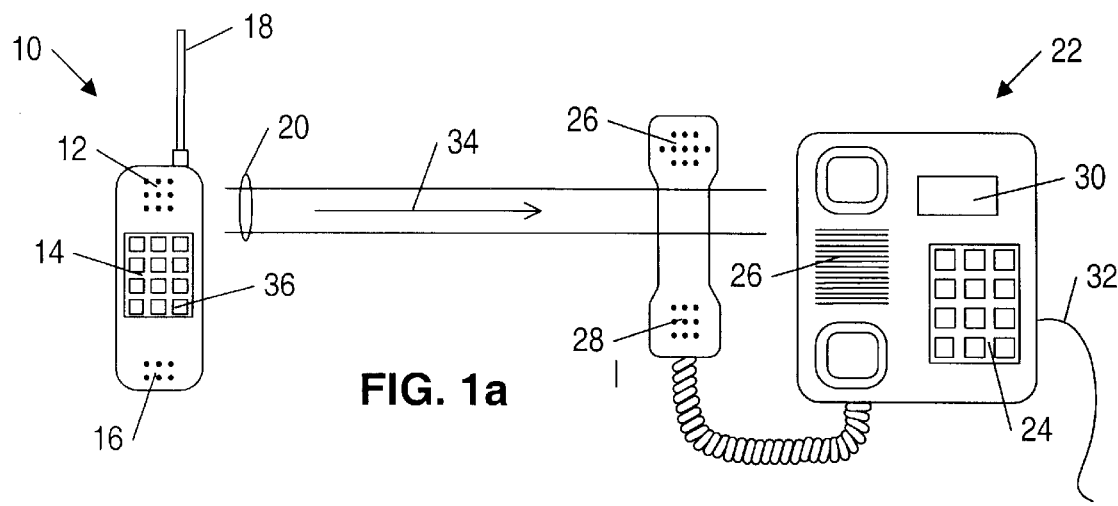
FIG. 1 illustrates communication between two telephones by code transmission.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates an example of communication between two telephones. First telephone 10 of FIG. 1(a) includes a loudspeaker output 12, a keypad 14, and a microphone input 16. Although shown as a wireless telephone including antenna 18 in FIG. 1(a), first telephone 10 may be a "fixed" (connected to a telephone network cable) or wireless telephone. In the embodiment of FIG. 1(a), a connection has been made between first telephone 10 and a second telephone 22. In addition to keypad 24, speaker outputs 26 (one for the receiver and one for speakerphone use) and microphone 28, second telephone 22 includes display screen 30. (A microphone is also located in the base of telephone 22 for speakerphone use, but is not always visible and is therefore not shown in FIG. 1.) Although shown as a fixed telephone using telephone cable 32, second telephone 22 may be either a fixed or wireless telephone. The connection between first telephone 10 and second telephone 22 is represented in FIG. 1(a) using connection path 20. An actual connection path between the telephones in the embodiment of FIG. 1(a) would include one or more wireless path portions between first telephone 10 and a tower or satellite, and one or more "wireline" portions. Depending on the type of telephone used at each end of connection path 20, the connection could also be entirely wireless or entirely along cables. The connection may be initiated in the conventional manner of using one of the telephones to dial the telephone number assigned to the other telephone. The connection may then be established if the telephone corresponding to the dialed number is "answered".

Once connection path 20 is established between the two telephones, a code may be transmitted from first telephone 10 to second telephone 22, as illustrated by arrow 34 in FIG. 1(a). Code transmission 34 may be initiated by sequentially pressing one or more of keys 36 within keypad 14 of first telephone 10. In a currently preferred embodiment, each code is entered by pressing no more than two keys, so that numerical codes from 0 to 99 may be used. Codes having 3 or more digits may also be used, however. An additional key, such as the pound sign "#", may be pressed to indicate the end of a code transmission. Alternatively, the receiving telephone may be configured to consider a code complete if no additional transmission is received within a programmable time interval (an interval of one second, for example, may be suitable). A shorter programmable time interval between keystrokes may be used to determine whether, for example, two single-digit codes are sent or one two-digit code is sent. In some embodiments a code may be entered by selection from a display of correspondence data stored within the transmitting telephone.

Numerical information may be sent by transmitting an escape sequence (e.g., one or two presses of the "*" or "#"key) to indicate to the receiving telephone that the ensuing keystrokes are to be interpreted as numbers rather than codes. This numeric mode may then be exited by repeating the escape sequence. A similar escape sequence may be used to enter a mode in which messages are sent one letter at a time, using methods such as those described in the "Description of the Related Art" section above. Such escape sequences are believed to be useful for transmitting detailed information such as addresses, dates, or times.

The signal format used in code transmission 34 depends upon the particular telephones and transmission path used. In a currently preferred embodiment, the DTMF tones corresponding to the pressed keys or selected code digits are sent to second telephone 22. Telephone 22 is configured to detect these DTMF tones and identify the message unit corresponding to the detected code. Code transmission 34 may not be in DTMF format for the entire length of connection path 20, however, particularly when a digital telephone is used. Although analog "touch-tone" telephones send DTMF tones in response to pressing of keypad keys, other telephones such as digital telephones do not rely on DTMF tones, sending different signals instead. A digital wireless telephone, for example, typically does not send DTMF tones to dial a telephone number. However, many such telephones may provide for sending of DTMF tones after a connection is made, so that, for example, telephone users may interact with automated interactive menu systems which often rely on DTMF tones. For example, pressing a key on a digital wireless telephone after a connection is made with another telephone may result in a digital signal being sent to a nearby relay tower. If the receiving telephone is connected to a cable telephone network, a switching station to route the digital signal into the cable telephone network will be encountered by the signal along its path. Conversion of the digital signal to a DTMF tone may be performed at this switching station. In an alternative embodiment, receiving telephone 22 may be configured to detect digital signals sent by digital telephones to represent keystrokes, instead of or in addition to detection of DTMF-formatted codes. In some embodiments, the receiving telephone could include or be connected to converters so that pulse signals from older telephones could be converted to a form detectable by the telephone.

The operator of first telephone 10 must know which message units correspond to which codes in order to send the intended message to the operator of second telephone 22. A list of codes and message units, possibly provided by the operator of the second telephone, may be used as a reference. Such a list could be printed or stored in memory in the first telephone. Because commercially-available telephones increasingly offer information storage features such as telephone number directories, storage of codes and corresponding message units in the first telephone would not necessarily require that the first telephone be configured to receive codes and forward corresponding message units to an output device. In an embodiment, however, the first telephone could be configured to forward the message corresponding to a selected code to a display screen on the first telephone, either before the selected code is transmitted to the second telephone or concurrently with this transmission. In some embodiments, correspondence data relating codes to message units may be downloaded from one telephone to another. In a preferred embodiment, a core set of codes, e.g. the single-digit codes from 0 to 9, could correspond to a consistent set of messages used in every code-compatible telephone. These messages would preferably be simple, commonly used messages (e.g., "Hello", "Yes", "No", etc.). To the extent that hearing-impaired people are anticipated to comprise a significant portion of code-enabled telephone users, such a core set of codes and messages could be developed in cooperation with a national or international organization for hearing-impaired persons.

Figure 1B:
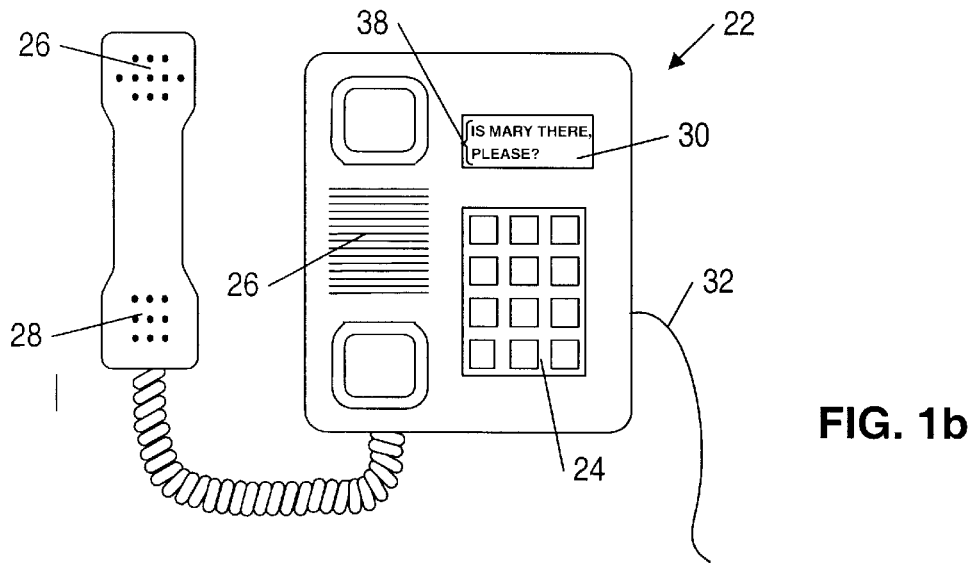

In response to code transmission 34 of FIG. 1(a), second telephone 22 detects the transmitted code, identifies the corresponding message unit, and forwards the message unit to the appropriate output device. If the identified message unit is alphanumeric or graphic (i.e., pictorial), it is forwarded to the telephone's display screen, as shown in FIG. 1(b). In the embodiment of FIG. 1(b), alphanumeric message 38 appears on display screen 30. If the detected code instead corresponds to a graphic, this image appears on the display screen 30 instead. Alternatively, the detected code may correspond to an auditory message, which is forwarded to the loudspeaker underlying speaker output 26. If, in an embodiment, all available message units are auditory, display screen 30 may not be needed on second telephone 22. A display screen would be needed, however, in embodiments for which an image or message is forwarded to the display screen to alert the telephone user that an auditory message is being sent. It should be noted that this forwarding of an auditory message to the speaker of telephone 22 in response to a code is distinct from existing systems in which an auditory message is played for a telephone caller in response to the caller's pressing a keypad key. Examples of such a system include automated interactive menu systems and remote-playback modes of answering machines. In these existing systems, an auditory message is transmitted to the calling telephone in response to a key pressed on the calling telephone. In the embodiment of the system described herein in which an auditory message corresponds to a code, the message is played on the telephone receiving the code, and not transmitted back to the telephone transmitting the code. A telephone such as second telephone 22 which is configured to detect a code and forward a corresponding message unit to an output device may be referred to herein as a "code-compatible telephone".

Figure 1C:
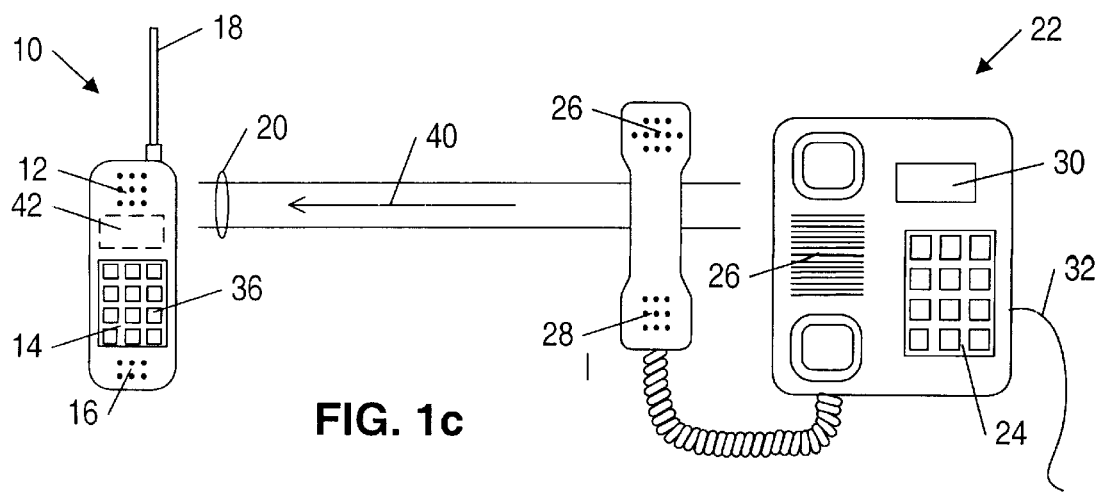

After observing the message unit resulting from code transmission 34, the operator of second telephone 22 then responds to the message, as illustrated in FIG. 1(c). The response, represented by arrow 40 in FIG. 1(c), can be either a spoken response or a code transmission. In embodiments for which arrow 40 represents a spoken response to code transmission 34, the communication illustrated in FIG. 1 is one-way non-spoken communication. As noted in previous sections, this configuration may be useful in multiple circumstances. For example, the operator of first telephone 10 may be able to both hear and speak well, while the operator of second telephone 22 may be able to speak but not hear well. One-way code transmission from telephone 10 to telephone 22 allows these two people to converse. Alternatively, the operator of first telephone 10 may be speech-impaired, but not hearing-impaired, while the operator of second telephone 22 can both hear and speak well. Code transmission may advantageously allow the operator of telephone 10 to converse without speaking. In another situation, in which neither person has speech or hearing disabilities, the operator of first telephone 10 may be in an environment in which it is undesirable to speak into a telephone.

In embodiments for which arrow 40 of FIG. 1(c) represents a code transmission similar to code transmission 34, two-way non-spoken communication occurs. In these embodiments, first telephone 10 must be a code-compatible telephone, in addition to second telephone 22. If arrow 40 represents transmission of a code corresponding to an alphanumeric or graphic message unit, telephone 10 must also include a display screen, such as screen 42. Two-way non-spoken communication may be advantageous for communication between two people who are each either hearing-impaired or speech-impaired. Furthermore, two-way code transmission is believed to be useful if at least one of the people communicating is both speech- and hearing-impaired. In situations in which neither person has a speech or hearing disability, two-way non-spoken communication may be advantageous if spoken communication is either undesirable in particular environments or difficult to distinguish over other noise.

Figure 2:
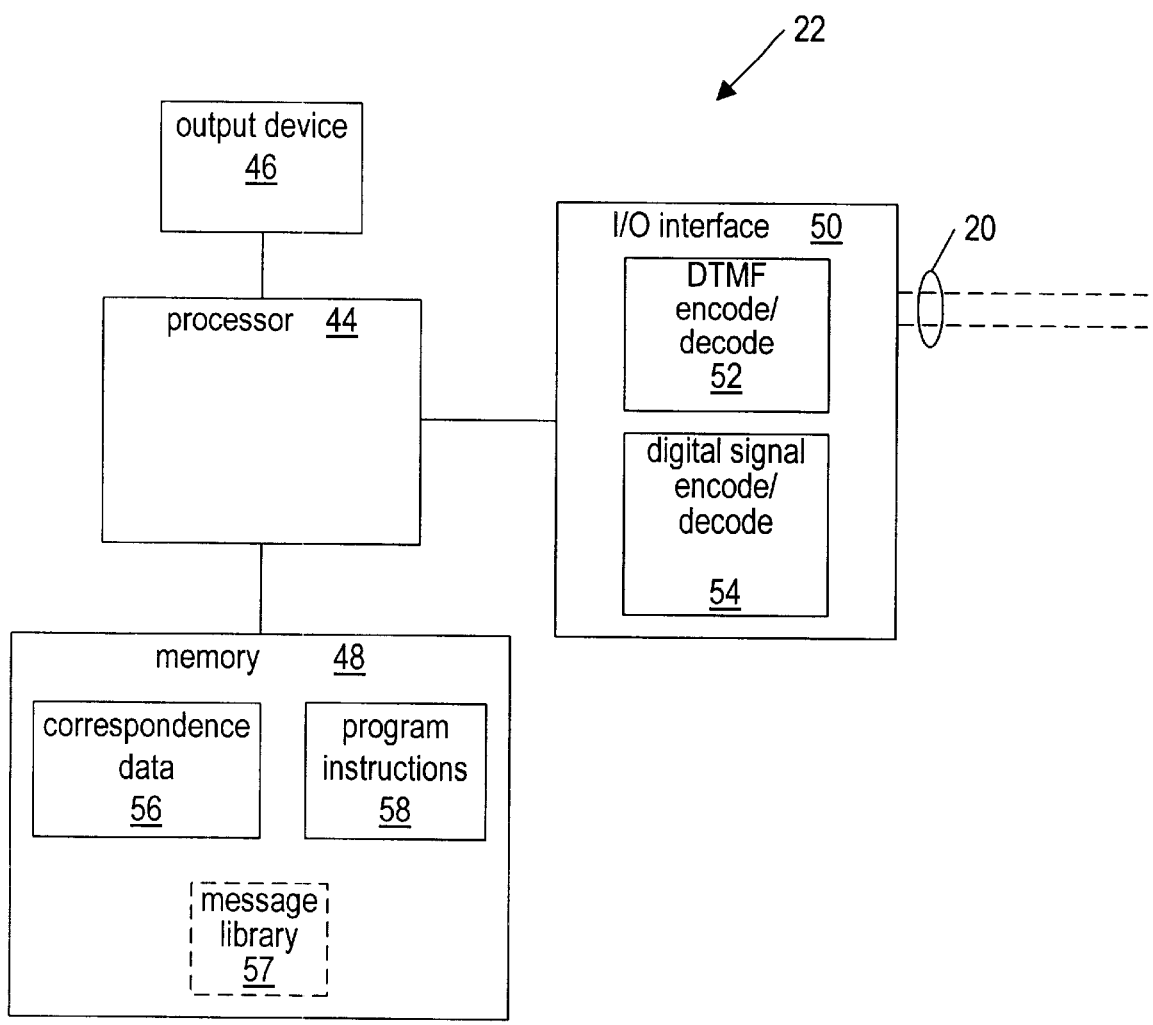
FIG. 2 is a block diagram illustrating an embodiment of a code-compatible telephone.

A block diagram illustrating an exemplary embodiment of code-compatible telephone 22 is shown in FIG. 2. Processor 44 is operably coupled to output device 46, memory 48, and input/output (I/O) interface 50. "Operably coupled" as used herein means physically and/or electrically coupled such that the coupled elements function together during operation of the system. Elements represented by dashed lines in the figures presented herein are either optional, appear only in some embodiments, or appear only at certain times. For example, display screen 42 on first telephone 10 in FIG. 1(c) is needed only in embodiments for which telephone 10 is code-compatible and contains alphanumeric or graphical message units. Similarly, connection path 20 between telephone 22 and another telephone, as shown in FIG. 2, is present only when a connection has been established. When present, connection path 20 is operably coupled to I/O interface 50, which is adapted to detect a code transmitted by another telephone. Depending upon the format of the signals received by I/O interface 50, the code detection may involve DTMF encoder/decoder 52 or digital signal encoder/decoder 54. For example, if telephone 22 is an analog telephone, DTMF tones may received, while digitally-encoded signals may be received if telephone 22 is a digital telephone. Correspondence data for storage in memory 48 may also be received by I/O interface 50 through communication path 20, or alternatively through a different connection path, such as a cable or wireless link to a computer.

Detection of a code by I/O interface 50 includes converting the received signal to a form which allows comparison of the code to correspondence data to identify the corresponding message unit. In an exemplary embodiment, this conversion includes detecting the signals received in response to sequential pressing of the "2" and "5" keys on another telephone, and passing a digital representation of the number "25" to processor 44. Upon receiving a detected code, processor 44 compares the code to correspondence data 56 to identify the message unit corresponding to the code. The message unit is forwarded to output device 46, which may be a display screen or a loudspeaker (in the case of auditory message units). In some embodiments for which the message unit is forwarded to a display screen, a display buffer is included which stores data forwarded to the screen. The storage capacity of the buffer is generally greater than the display capacity of the screen, so that more message information is stored in the buffer than can be displayed on the screen at a given time. Such a buffer may therefore allow a user to scroll backward or forward through a message or sequence of messages to ensure accurate comprehension.

Depending upon the participants in a particular conversation, customized sets of message units may be desirable, as noted above and in the discussion of FIG. 3 below. If multiple different sets of messages are used at different times, it may be desirable to store more message units within the telephone than can simultaneously be assigned to codes. Such messages may be stored in message library 57. When needed, a portion of the message units in message library 57 may be moved to correspondence data 56 (possibly overwriting other message units in correspondence data 56 which are not needed at the time). In some embodiments, message library 57 may be selected by the user of telephone 22 for installation within the telephone. For example, library 57 may be selected from among various available libraries, each containing a different combination of message units. Message library 57 could be installed as, for example, a removable semiconductor chip, or a set of data loaded into memory using the telephone's communication link or any other data input device associated with the telephone.

The code detection, message unit identification and sending of the message unit to the output device are preferably accomplished through execution of program instructions 58. In FIG. 2 and any other block diagrams appearing herein, the blocks are intended to represent functionality rather than specific structure. Implementation of the represented device using circuitry and/or software could involve combination of multiple blocks into a single circuit, or combination of multiple circuits to realize the function of a block. For example, at least a portion of memory 48 and/or I/O interface 50 of FIG. 2 could be included within processor 44 in some embodiments. Furthermore, the elements of the code-compatible telephone may be interconnected in ways other than those explicitly shown in FIG. 2.

Turning now to FIG. 3, tables illustrating examples of information which may be included within correspondence data 56 of FIG. 2 are shown. In FIG. 3(a), exemplary code data 60 and corresponding alphanumeric message data 62 are shown. Code data 60 includes codes in the form of numbers, entered by pressing the appropriate number key or keys on the keypad of the transmitting telephone. Each of the codes is linked to a corresponding alphanumeric message unit within message data 62. In the embodiment of FIG. 3(a), one-digit codes 64 are universal or "standard" codes which correspond to standard message units 66, and are used in every code-compatible telephone. In some embodiments, the portion of correspondence data 56 embodying standard codes 64 and corresponding standard message units 66 may be write-protected so that it cannot be changed by the telephone user without assistance from the manufacturer. Two-digit codes 68 are "custom" codes corresponding to custom message units 70. Ninety custom message units may therefore be accessed in the embodiment of FIG. 3(a), if the custom codes are limited to two-digit numbers. The custom message units may be chosen and entered by, for example, the telephone user, or by people or entities with which the user interacts. In some embodiments, correspondence data for at least some of custom codes 68 is entered by the manufacturer, but may be changed by the user. The correspondence data may be entered or changed by methods including manual entry using data entry and management features of the telephone (as may be available for storing telephone number information, for example), or downloading data from another telephone or from a computer. Custom messages 70 may be related to personal life, as in the case of codes "10" and "11" in FIG. 3(a), or may be chosen for use with a particular entity such as an employer, a financial institution, or a doctor's office (as could be the case for code "99").

In the data of FIG. 3(a), all of the message units illustrated are alphanumeric message units. In the information shown in FIG. 3(b), on the other hand, code data 60 may correspond to diverse message types within message type data 72, indicating the type of message unit represented by message unit data 74. For example, codes "21" and "22" correspond to alphanumeric message units, represented in FIG. 3(b) as type "AN". Code "23", however, corresponds to a graphic message unit, represented as type "GR", while code "24" corresponds to an auditory message unit, represented as type "AU". Codes "*" and "**" correspond to functions affecting the way codes are interpreted or displayed, represented as type "FN". It should be noted that although message type data 72 and message unit data 74 are displayed in separate columns of the table of FIG. 3(b), data 72 and data 74 are interdependent. For example, if the message type data 72 for a particular code were changed, the message unit data 74 would have to be changed as well. It is further noted that the assignment of codes to message units as shown in FIG. 3 is purely exemplary, and that any of the codes shown could correspond to different message units in other embodiments.

The tables shown in FIG. 3 illustrate examples of information which may be contained within correspondence data 56 of FIG. 2. The particular form of the correspondence data may vary. For example, the graphic message unit corresponding to code "23" in FIG. 3(b) may be stored as digitized image data (as shown), or may be stored in another way (e.g., as program instructions which direct the formation of a particular graphic on a display screen). Correspondence data using information such as that of FIG. 3 may be stored using various data structures, or organization methods. For example, a look-up table may be used to relate code data 60 to message unit data 74 or 62 and/or message type data 72.

Figure 4:
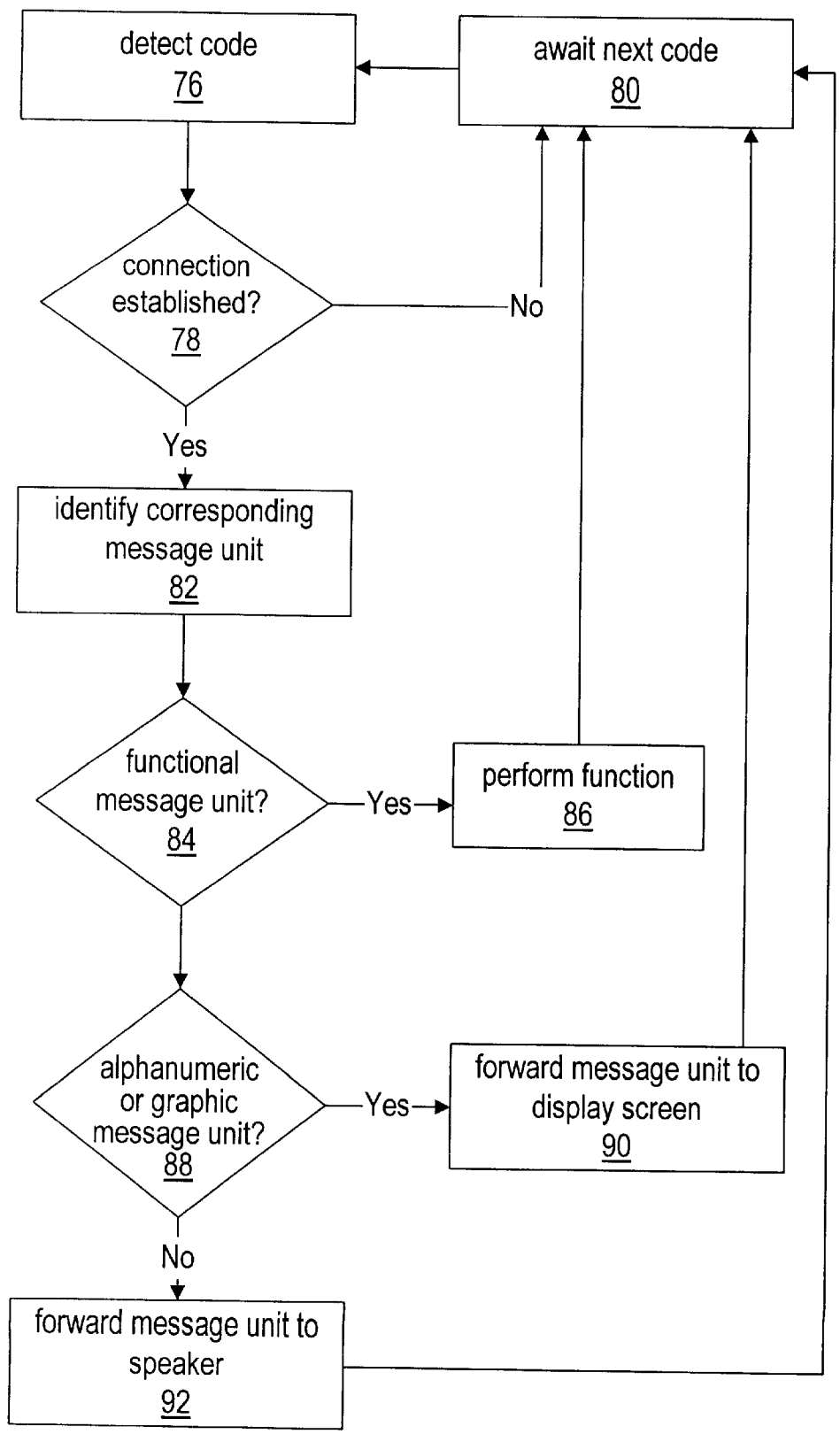
FIG. 4 is a flow diagram illustrating an embodiment of a method for processing an input to a code-enabled telephone.

A flow diagram illustrating an embodiment of a method for processing an input to a code-compatible telephone is shown in FIG. 4. Such a method may be implemented by execution of program instructions 58 of FIG. 2. Upon detection of a code (box 76), using, for example, I/O interface 50 of FIG. 2, it is determined whether a connection exists between the transmitting and receiving telephones (box 78). If a connection is not established, the detected signal may be part of an attempt to establish a connection rather than a message unit code. In a preferred embodiment, determining whether a connection is established includes determining whether a person has answered the receiving telephone (e.g., by lifting a receiver or pushing a button). In this manner, interception of codes intended for remote control of an answering machine, after the machine has answered the telephone, may be avoided. If no connection is established, the detected code is ignored and an additional code is awaited (box 80). If a connection has been established, on the other hand, the message unit corresponding to the detected code is identified (box 82). This identification may be performed by comparing the detected code to correspondence data 56 of FIG. 2.

In some embodiments, establishing a connection may also include a "handshaking" procedure between the transmitting and receiving telephones. Handshaking involves exchanging information between two or more devices to arrive at a common protocol for further communication, so that data sent between the devices is properly received and interpreted. A handshaking procedure may be useful, for example, in embodiments for which a set of correspondence data is transmitted from a first telephone to a code-enabled second telephone, so that the user of the second telephone may receive messages regarding a specialized topic. Before such correspondence data is transmitted, however, a handshaking procedure could be used to establish whether the relevant correspondence data is already stored on the second telephone, and/or whether the most recent version of the correspondence data is stored. Correspondence data could then be transmitted if necessary, so that the ensuing code transmissions would be properly interpreted. In embodiments which do not involve downloading of correspondence data from one telephone to another, however, handshaking may not be a necessary part of establishing a connection. The need for handshaking may also depend on the degree of standardization of code formats among different code-compatible telephones (e.g., the number of digits used in a code, or whether a "send" character is used). When used, the handshaking may also occur at a different point in the flow diagram of FIG. 4, such as before the first code detection (box 76).

Handshaking between the transmitting and receiving telephones may also be employed after a connection is established between the telephones, in order to regulate the flow of code transmissions between the telephones. For example, the receiving telephone may send a request to the transmitting telephone to suspend code transmission, to allow time for display of messages associated with previous codes. Resumption of code transmission could be requested in response to an input from the user of the receiving telephone. Such requests to suspend or resume transmission may be similar to the XON/XOFF handshaking which may be used among computers and computer peripherals. Alternatively or additionally, this type of handshaking could take place between a telephone and its user, such as by the user pushing a button to suspend or resume display of message information stored in a buffer. Such control of the rate at which message information is forwarded to a display is believed to be necessitated by the relatively small size of many telephone displays.

After a message unit is identified in the embodiment of FIG. 4, a determination is first made (box 84) as to whether the identified message unit contains functional information (e.g., a message unit of type "FN" in FIG. 3). If so, the function is performed (box 86), and the next code is then awaited. Some examples of functions which may be prompted by codes include (i) configuring the telephone to interpret subsequent codes as numerical data, (ii) concatenating the next incoming code with the one previously received to form a message containing multiple message units (these functions are included in FIG. 3(b)), and (iii) responding to a query offering the option of downloading correspondence data. Responding to a query regarding downloading of correspondence data could involve, for example, downloading the data, forwarding a message to the display screen to prompt the user to decide whether to download, or sending a reply to the other telephone that no download is needed. This query regarding downloading of correspondence data may alternatively be included in a handshaking procedure, as discussed above.

With respect to downloading of correspondence data between telephones, it is noted that in some embodiments correspondence data including a specialized vocabulary of codes and corresponding message units may be downloaded from one telephone to a code-compatible telephone independent of, or without (absence of), any action being taken by the user of the code-compatible telephone. Such a transfer may be advantageous for situations in which communication on a specialized topic is needed. As an example, if a hearing-impaired person were to make a telephone call using a code-compatible telephone to report an emergency (currently usually done by dialing 911), a vocabulary containing codes for questions to be asked by the emergency dispatcher could be initially downloaded to the hearing-impaired person's telephone. This initial transfer of correspondence data could allow critically important information to be obtained quickly with a minimized probability of confusion. The downloading of correspondence data may be initiated by a human operator of the downloading telephone, or may be performed automatically (for example, as part of a handshaking protocol as described above).

Continuing with the method of FIG. 4, if the identified message unit is not a functional message unit, it is then determined whether it is an alphanumeric or graphical message unit (box 88). If so, the message unit is forwarded to the display screen of the code-compatible telephone (box 90). If the message unit is not alphanumeric or graphical, it is assumed to be auditory and is forwarded to the telephone's speaker (box 92). As also described above, forwarding an auditory message to the speaker is accompanied in some embodiments with forwarding a visual indication to the display to alert the user that auditory information is being sent. In such an embodiment, box 92 would also include forwarding this visual alert information to the display screen. The visual alert information may be forwarded to the display screen a short time before the auditory message is forwarded to the speaker. In some embodiments, the determination of the type of message unit identified, as in boxes 84 and 88 of FIG. 4, may be performed by evaluation of message type data such as message type data 72 (shown in FIG. 3(b)) within correspondence data 56 (shown in FIG. 2). The order in which the different message types are considered may be different than that shown in FIG. 4.

Program instructions, such as instructions 58 of FIG. 2, implementing a method such as the above-described method for processing compound key inputs may be transmitted over or stored on a carrier medium. The carrier medium may be a wire, cable, or wireless transmission link, or a signal traveling along such a wire, cable or link. The carrier medium may also be a storage medium, such as a volatile or non-volatile memory (e.g., read-only memory or random access memory), a magnetic or optical disk, or a magnetic tape.

It will be appreciated by those skilled in the art having the benefit of this disclosure that this invention is believed to provide a system and method for non-spoken telephone communication by transmitting a short code to a code-compatible telephone to initiate output of a message on the code-compatible telephone. Furthermore, it is also to be understood that the form of the invention shown and described is to be taken as exemplary, presently preferred embodiments. Various modifications and changes may be made without departing from the spirit and scope of the invention as set forth in the claims. In particular, the system and methods described herein may be implemented using many combinations of hardware and/or software, and at one or more of many different levels of hardware and/or software, as is the case with many processor-based applications. It is intended that the following claims be interpreted to embrace all such modifications and changes.

What is claimed is:

1. A code-compatible telephone, comprising:
 a display screen;
 an input/output interface adapted to detect a code transmitted by an additional telephone;
 a processor operably coupled to the input/output interface and the display screen;
 a first set of memory locations operably coupled to the processor, wherein the first set of memory locations contains program instructions executable by the processor for (i) determining whether a message unit corresponding to a detected code is visual or auditory, and (ii) forwarding the message unit to an appropriate output device according to said determining; and
 a second set of memory locations operably coupled to the processor, wherein the second set of memory locations contains correspondence data accessible by the processor for said determining, and wherein said input/output interface is further adapted to transmit and receive one or more message unit sets of said correspondence data.

2. The telephone as recited in claim 1, wherein the code comprises a dual-tone-multi-frequency (DTMF) tone.

3. The telephone as recited in claim 1, wherein the code comprises a digital signal.

4. The telephone as recited in claim 1, wherein the input/output interface is further adapted to download the correspondence data over a cable or wireless connection.

5. The telephone as recited in claim 1, wherein the input/output interface is further adapted to transmit the correspondence data over a cable or wireless connection.

6. A code-compatible telephone, comprising:
 an output device;
 an input/output interface adapted to detect a code received from an additional telephone;
 a processor operably coupled to the input/output interface and the output device;
 a first set of memory locations operably coupled to the processor, wherein the first set of memory locations contains program instructions executable by the processor for (i) identifying a message unit corresponding to the detected code and (ii) forwarding the message unit to the output device, independent of transmitting the message unit to the additional telephone; and
 a second set of memory locations operably coupled to the processor, wherein the second set of memory locations contains correspondence data accessible by the processor for said identifying, and wherein the input/output interface is further adapted to transmit and receive at least a portion of the correspondence data over a cable or wireless connection.

7. The telephone as recited in claim 6, wherein said non-alphanumeric message unit comprises graphical information, and said output device comprises a display screen.

8. The telephone as recited in claim 6, wherein said non-alphanumeric message unit comprises auditory information, and said output device comprises a loudspeaker.

9. The code-compatible telephone of claim 6, wherein said input/output interface is further adapted to transmit and receive one or more message unit sets of the correspondence data.

* * * * *